A. J. MACY.
METHOD OF AUTOMATIC CONTROL FOR VEHICLES.
APPLICATION FILED MAR. 25, 1916.
1,326,946.
Patented Jan. 6, 1920.
5 SHEETS—SHEET 1.
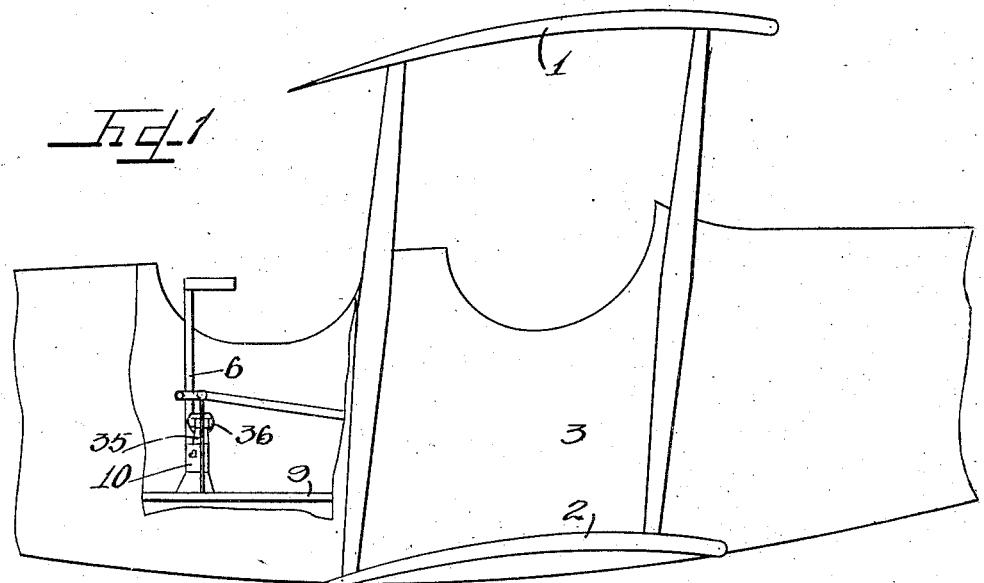
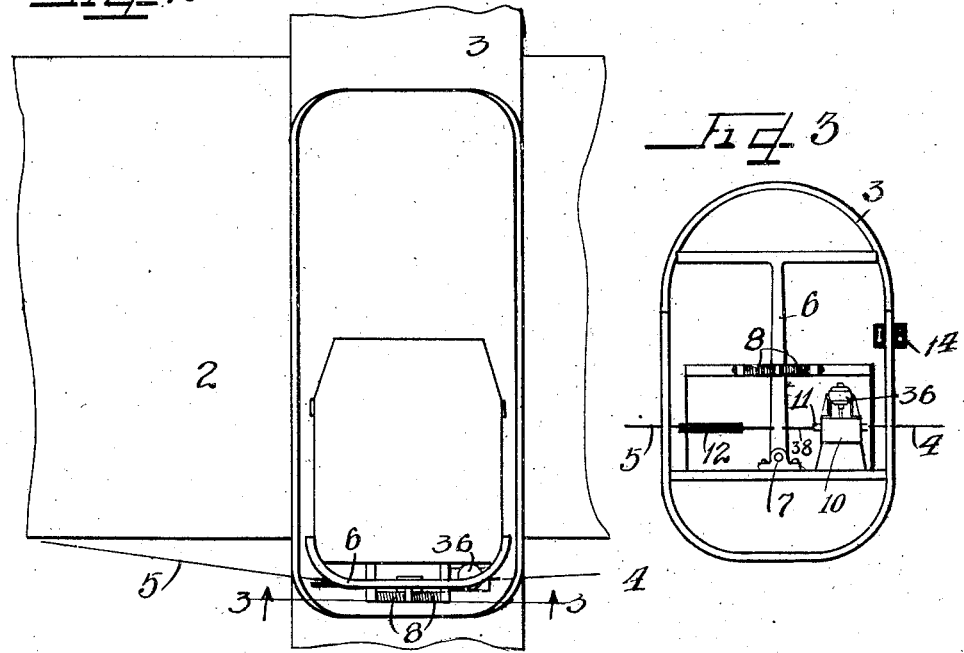
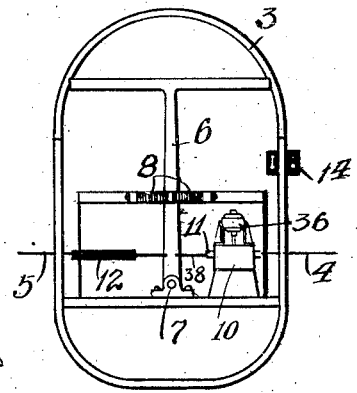

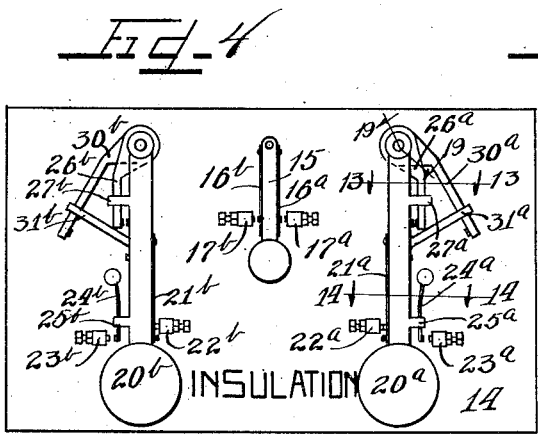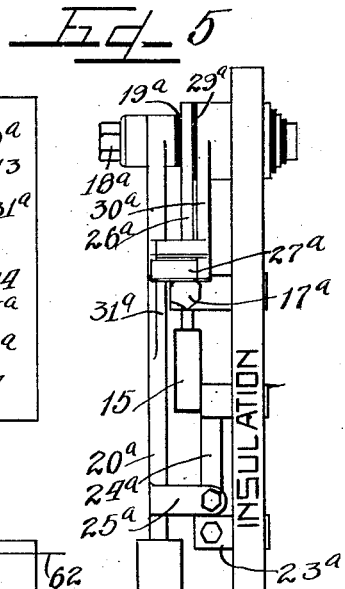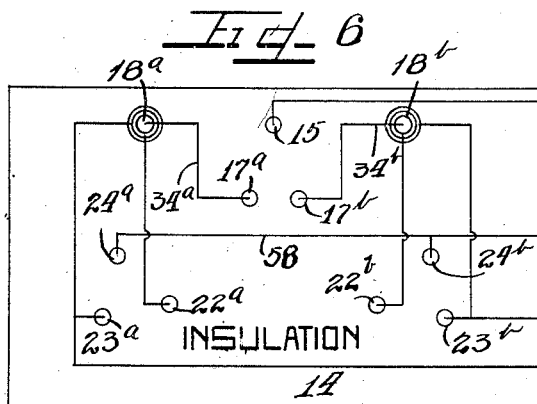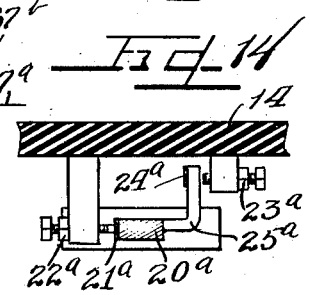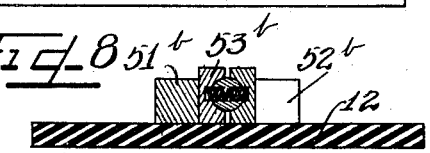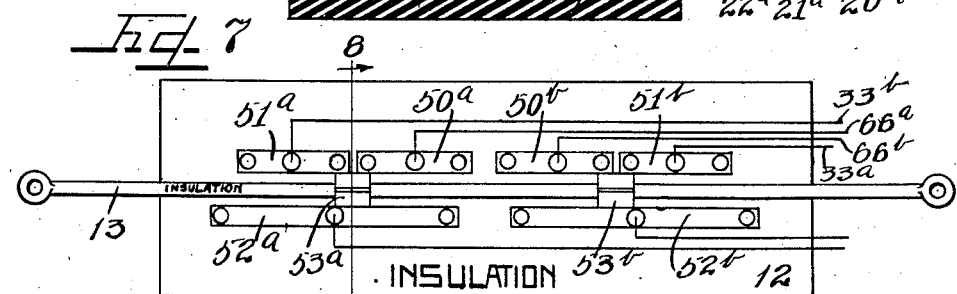

A. J. MACY.
METHOD OF AUTOMATIC CONTROL FOR VEHICLES.
APPLICATION FILED MAR. 25, 1916.
1,326,946.
Patented Jan. 6, 1920.
5 SHEETS—SHEET 3.
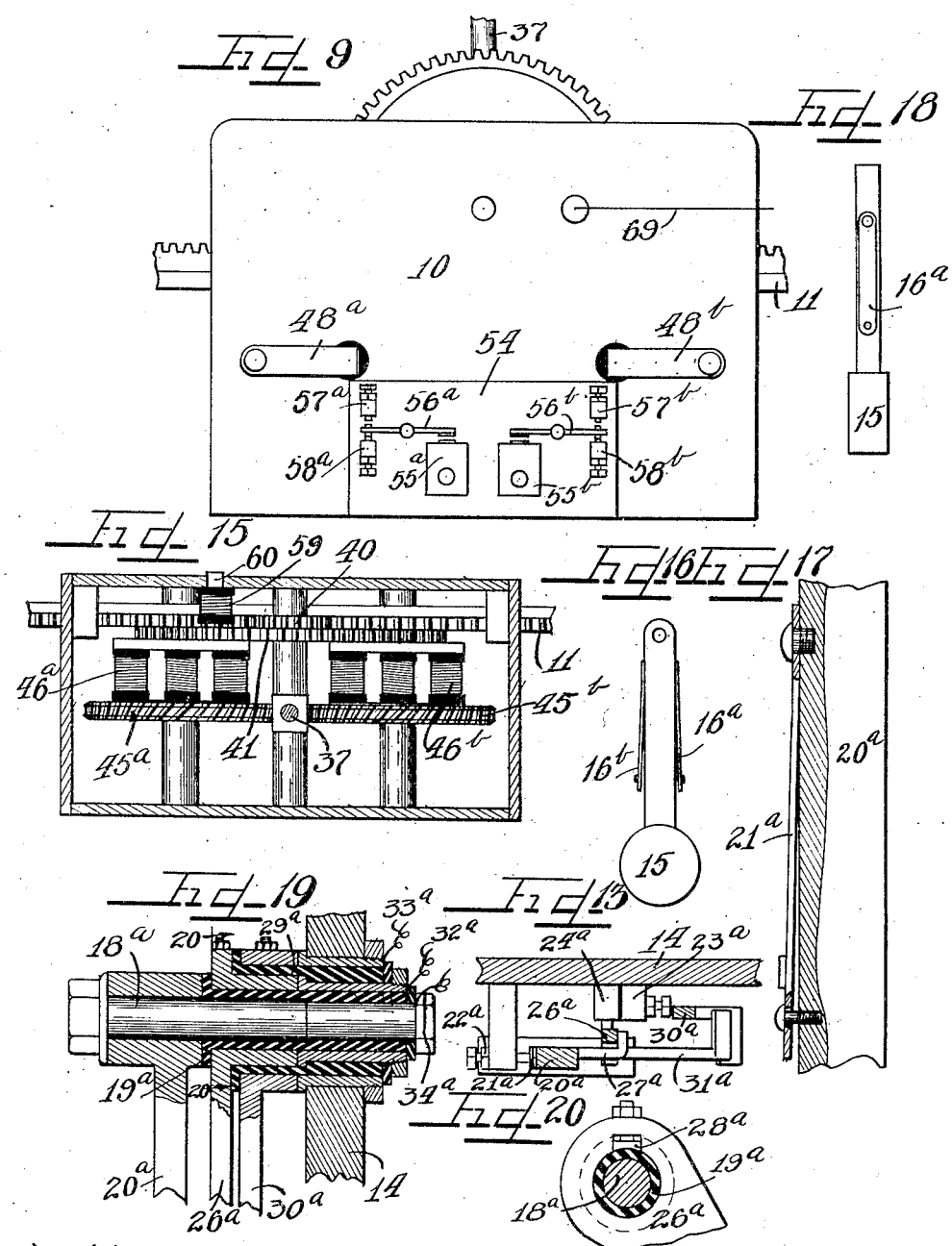

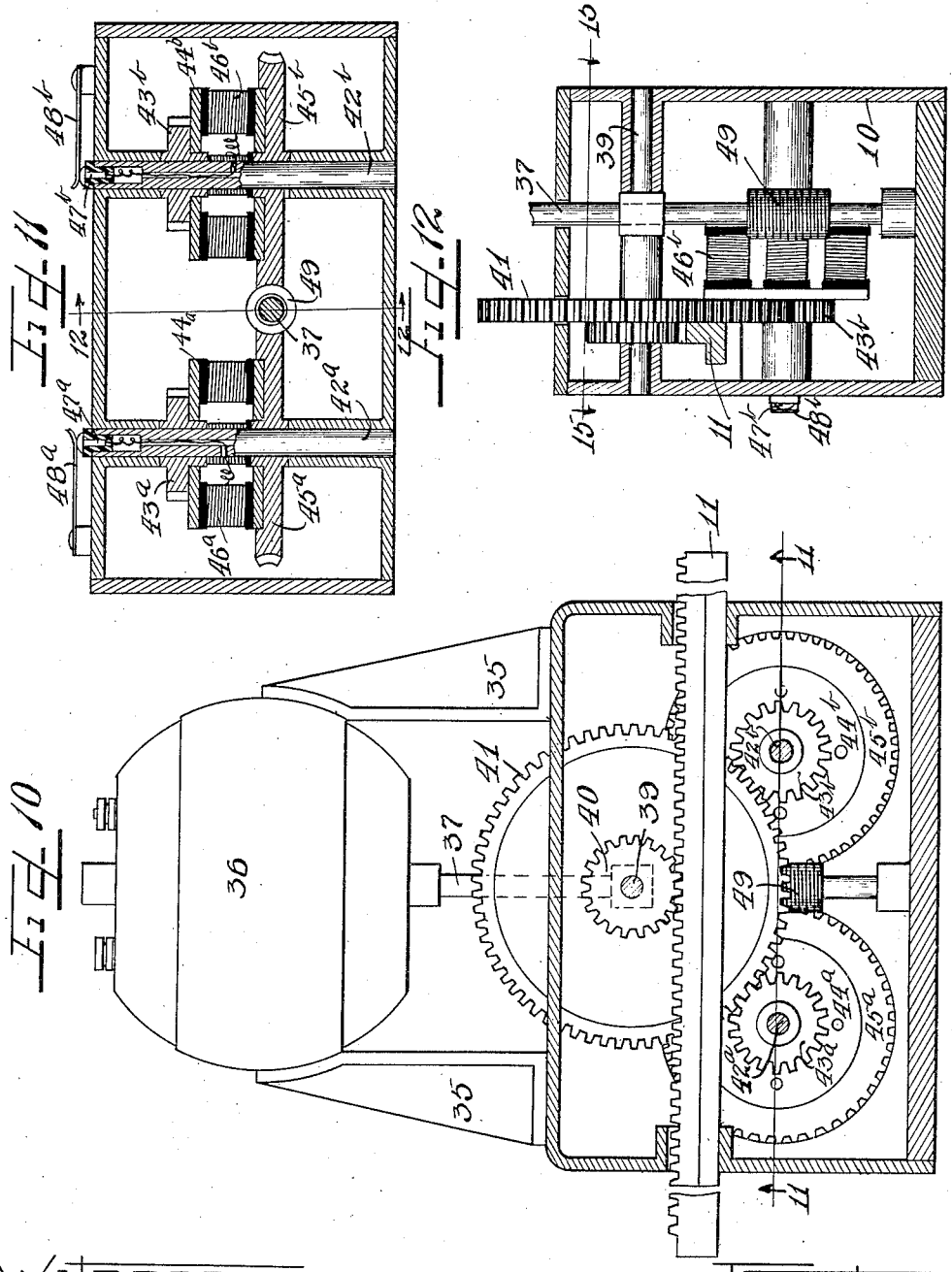

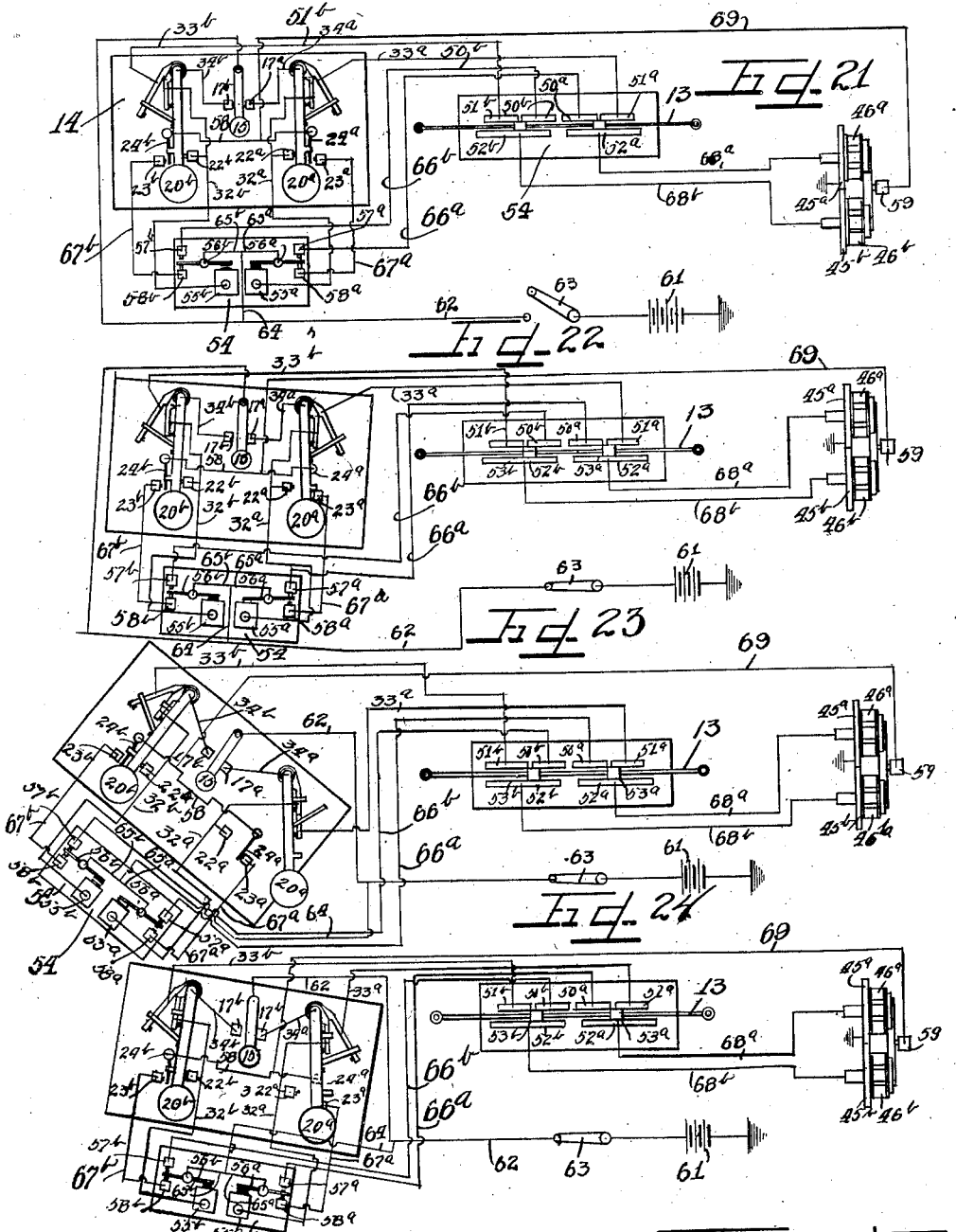

UNITED STATES PATENT OFFICE.

ALFRED J. MACY, OF CHICAGO, ILLINOIS, ASSIGNOR TO MACY ENGINEERING COMPANY, OF FRANKLIN, PENNSYLVANIA, A CORPORATION OF MAINE.

METHOD OF AUTOMATIC CONTROL FOR VEHICLES.

1,326,946.        Specification of Letters Patent.        Patented Jan. 6, 1920.

Application filed March 25, 1916. Serial No. 86,613.

*To all whom it may concern:*

Be it known that I, ALFRED J. MACY, a citizen of the United States, and a resident of the city of Chicago, in the county of Cook and State of Illinois, have invented certain new and useful Improvements in Methods of Automatic Control for Vehicles; and I do hereby declare that the following is a full, clear, and exact description of the same, reference being had to the accompanying drawings, and to the numerals of reference marked thereon, which form a part of this specification.

This invention relates particularly to a method of control of an apparatus adapted particularly for use on aeroplanes, whereby the guiding or controlling means of the machine are actuated to maintain the same in a proper, normal or predetermined attitude of flight. Many different types of so-called aeroplane stabilizers have been constructed which operate to adjust the controlling surfaces of the aeroplane in accordance with the deflection or deviation of the aeroplane from its predetermined course, but the objection to all such devices has been what may be termed over-control, that is, the stabilizing mechanisms act to maintain the controlling means in an adjusted position up to the time that the aeroplane reaches its normal flying position, and as a consequence the momentum of the aeroplane returning to such position from a deflected position, carries the aeroplane over and beyond its normal position.

My method of control, however, obviates any such occurrence, and furthermore the method of control is slightly different for different degrees of deflection or deviation of the aeroplane or other vehicle upon which the apparatus may be connected, from its predetermined attitude and course, so that the restoring effect imposed upon the aeroplane may be applied with different degrees of effectiveness according to the intensity and degree of deflection of the aeroplane from its normal attitude.

It is an object therefore of this invention to provide a method of control for an apparatus on an aeroplane to be connected with the actuating means for the controls of the aeroplane whereby the same may be automatically operated to maintain the aeroplane on an even keel or at a bank, and which acts to restore the same to normal flying attitude when deflected therefrom for any causes whatsoever.

It is also an object of this invention to provide a method of aeroplane control whereby the controls of the aeroplane are actuated to correct deflections or tilting of the aeroplane from a predetermined attitude of flight, restoring the same to normal without the objectionable feature of over-control, or, in other words, moving the same beyond its normal flying position by the restoration effect thereon.

It is also an object of this invention to provide a method of aeroplane or other vehicle control by utilizing gravity acting levers or plumbs and electrical circuits for energizing electrical driving devices whereby the aeroplane controls are actuated, and with the mechanisms which close and open the electric circuit so constructed that a different series of operations is passed through for different degrees and intensity of deflection of a vehicle from its predetermined attitude to restore the same to normal attitude during movement without possibility of over-control.

It is finally an object of this invention to provide a method for automatic control of a vehicle to restore the same to normal attitude during movement when the same is deflected therefrom in a manner whereby the restoring effect varies directly with the intensity and degree of deflection and yet without the possibility of over-control, which would cause movement of the vehicle beyond normal attitude of movement in restoring the same thereto.

The invention (in a preferred form) is illustrated in the drawings and hereinafter more fully described.

In the drawings:

Figure 1 is a fragmentary side elevation of the body of an aeroplane broken away to show the connection therewith of a device embodying the principles of my invention.

Fig. 2 is a fragmentary top plan view with parts omitted, of the mechanisms illustrated in Fig. 1.

Fig. 3 is a detail section on line 3—3 of Fig. 2, with parts omitted.

Fig. 4 is a front elevation of the instrument board of the apparatus.

Fig. 5 is an edge view thereof.

Fig. 6 is a rear elevation of said board, showing the wiring.

Fig. 7 is a plan view of a switch mechanism forming a part of the apparatus.

Fig. 8 is a sectional detail on line 8—8 of Fig. 7.

Fig. 9 is a fragmentary rear elevational view of the casing containing the motor driven magnetic clutches.

Fig. 10 is a front elevational view thereof with the casing broken away and shown in section to illustrate the interior mechanisms.

Fig. 11 is a sectional detail taken on line 11—11 of Fig. 10, with parts shown in elevation.

Fig. 12 is a fragmentary detail section taken on line 12—12 of Fig. 11, with parts shown in elevation.

Fig. 13 is a fragmentary detail section taken on line 13—13 of Fig. 4, with parts shown in elevation.

Fig. 14 is a detail section taken on line 14—14 of Fig. 4.

Fig. 15 is a detail sectional view taken on line 15—15 of Fig. 12, with parts shown in elevation.

Fig. 16 is a detail front view of the central gravity acting lever of the board shown in Fig. 4.

Fig. 17 is a fragmentary detail view partly in section and partly in elevation, illustrating a resilient contact member on the edge of one of the gravity acting levers.

Fig. 18 is a side view of the gravity acting lever shown in Fig. 16.

Fig. 19 is a detail section taken on line 19—19 of Fig. 4.

Fig. 20 is a detail section taken on line 20—20 of Fig. 19, with parts omitted.

Fig. 21 is a diagrammatic view illustrating the wiring for the apparatus with the instrument board and gravity acting levers in normal upright position.

Fig. 22 is a similar view, illustrating the instrument board tilted by a movement of the second degree.

Fig. 23 is a similar view, showing the instrument board tilted to its maximum or third degree.

Fig. 24 is a view illustrating the instrument board tilted, but returning toward normal position.

As shown in the drawings:

The aeroplane consists of upper and lower surfaces 1 and 2, respectively, with a body 3, shown fragmentarily, mounted therebetween, and within which the power plant and operating mechanisms for the controls of the aeroplane are situated. The lateral controls or ailerons (not shown) are operated by cables, that for the right wing of the aeroplane denoted by the reference numeral 4, and that for the left wing by the reference numeral 5. These cables lead into the operating compartment in the body 3, and are connected, as hereinafter described, to an upright shoulder piece or lever 6, which is secured upon a pivot 7, journaled longitudinally of the body 3, permitting said lever to be oscillated by the shoulders of an operator seated within the body to thereby operate the controlling cables 4 and 5. The oscillating movement of the lever 6, is resisted by coiled springs 8, mounted on each side thereof, as clearly shown in Fig. 3, said springs normally acting to return said lever 6, to central upright position, actuating the cables 4 and 5, therewith after the same have been actuated and released.

At one side of said upright lever 6, mounted upon the floor 9, on which said lever is pivoted, is a casing 10, through which a rack bar 11, extends, with one of its ends connected to the cable 4, and the other linked to the lever 6, and on the opposite side of said lever 6, the insulating base 12, of a switch element is shown, and connected to the cable 5, is one end of a switch bar 13, of insulating material, with its other end linked to said upright lever 6. Mounted transversely of the body 3, and at one side thereof, is an instrument board 14, which may be pivotally mounted on the body, if so desired. Said board is constructed of insulating material, and an enlarged front face view thereof is shown in Fig. 4. Pivotally mounted upon the front surface of said instrument board is a small centrally disposed gravity acting lever 15, having on each edge thereof a resilient contact member 16ᵃ and 16ᵇ, respectively, each adapted to contact one of the terminals 17ᵃ and 17ᵇ, respectively, provided on said board, one on each side of the lever. Said instrument board is also provided with two similar gravity acting levers for the electrical circuits which control the operation of the right and left lateral controlling means of the aeroplane. The operation of the mechanisms associated with one of said levers is exactly similar and identical in every respect with that for the other lever, and for convenience of illustration and description, those mechanisms for the upward control of the right wing and vice versa for the left wing of the aeroplane, are denoted by the reference numerals having the sub-letter "a" appended thereto, and those mechanisms for the upward control of the left wing and vice versa for the right wing, are denoted by the same reference numerals having the sub-letter "b" appended thereto. In other words, it is understood that the cables which actually shift the wing controls are interconnected in the usual and well known manner, so that actuation of one wing control in one direction results in a similar adjustment of the other wing control in the opposite direction.

Secured in said instrument board 14, and insulated therefrom, are pintle bolts 18ª and 18ᵇ, a detail of one of which is shown in Fig. 19, and surrounding each thereof are insulating sleeves 19ª and 19ᵇ, respectively. Pivotally hung on the outer end of each of the bolts and in electrical contact therewith are gravity acting levers 20ª and 20ᵇ, respectively. Secured on the inner edge of each of the levers 20ª and 20ᵇ, are resilient contact members 21ª and 21ᵇ, respectively, and mounted upon the board 14, are adjustable terminal posts or contacts 22ª and 22ᵇ, respectively, normally contacted by said members 21ª and 21ᵇ. Mounted upon the insulating board 14, at the other side of each of the gravity acting levers, though not projecting outwardly from the board as far as the levers, are adjustable terminal contacts 23ª and 23ᵇ, respectively, each adapted to be contacted by the lower end of resilient contact members 24ª and 24ᵇ, respectively, also mounted on the instrument board but normally retained from contact with said terminals 23ª and 23ᵇ, by L-shaped extensions 25ª and 25ᵇ, respectively, provided on the gravity acting levers.

Frictionally journaled on each of the insulating sleeves 19ª and 19ᵇ, are contact levers 26ª and 26ᵇ, respectively, which project downwardly substantially parallel and at one side of the gravity acting levers, and at their lower ends are each provided with a contact point adapted to close against the contact point provided on said levers and angled L-shaped extensions 27ª and 27ᵇ, respectively, are provided on said gravity levers to project over said depending levers 26ª and 26ᵇ, to permit movement thereof toward, but to limit the movement away from the gravity acting levers. Each of said contact levers 26ª and 26ᵇ, is provided with a friction shoe, a detail of which is shown in Fig. 20, denoted by the reference numeral 28ª, adapted to bear upon the insulating sleeves and adjustable by means of a threaded bolt and nut for the purpose to increase or decrease the friction, so that there is a tendency for said contact levers to move with said instrument board 14, when the same moves as a whole with the body of the aeroplane.

Surrounding the hub extension of each of the contact levers 26ª and 26ᵇ, are insulating sleeves 29ª and 29ᵇ, respectively, extending through said instrument board 14, and journaled on said sleeves are contact levers 30ª and 30ᵇ, respectively, also provided with friction shoes similar to those described, and which also tend to move with said board, due to their frictional pivotal engagement with the insulating sleeves. Formed on each of the gravity acting levers 20ª and 20ᵇ, are long extensions 31ª and 31ᵇ, respectively, adapted to engage over the ends of the contact levers 30ª and 30ᵇ, to limit the distance of separation thereof from said gravity acting levers and yet permitting said contact levers moving with the board 14, to approach and contact said gravity acting levers. As clearly shown in the detail view in Fig. 19, metallic conductor sleeves are provided for the respective levers 26ª and 26ᵇ, and 30ª and 30ᵇ, and connected to said conductor sleeves are wires 32ª and 32ᵇ, 33ª and 33ᵇ, respectively, and to the pivot bolts 18ª and 18ᵇ, are connected the respective wires 34ª and 34ᵇ.

Referring next to the magnetic clutches and means for actuating the control lever 6, mounted in brackets 35, on the upper end of the casing 10, is a motor 36, having a vertically disposed motor shaft 37, extending downwardly into the casing 10. Said rack bar 11, which extends slidably through the casing 10, is connected by means of a link 38, with the upright lever 6. Journaled within the casing 10, is an idler shaft 39, on which is secured a pinion 40, meshing with the teeth of the rack bar 11, and having also rigidly secured thereon a large gear 41, the upper portion of which extends beyond the walls of the casing through a slot provided therefor.

Also journaled within the casing 10, are shafts 42ª, and 42ᵇ, respectively, each provided with a pinion, one denoted by the reference numeral 43ª, and the other denoted by the reference numeral 43ᵇ, and both meshing with the gear 41. Rigidly secured or connected in any manner to said respective pinions 43ª and 43ᵇ, are magnetic disks 44ª and 44ᵇ, respectively. Keyed upon said respective shafts 42ª and 42ᵇ, are worm wheels 45ª and 45ᵇ, respectively, and secured upon a disk recessed into each of said worm wheels are a plurality of magnetic coils, those for one of the gears denoted by the reference numeral 46ª, and those for the other gear denoted by the reference numeral 46ᵇ, said coils, when magnetized, adapted to attract the disks 44ª and 44ᵇ, that is, either one or the other thereof, as the case may be, to cause the same and the pinion associated therewith to rotate with the respective worm wheel.

One terminal of each group of coils (which are connected in parallel for the respective worm wheels 45ª and 45ᵇ,) is grounded and the other led through an axial recess in its shaft and outwardly to a contact button or pin which, for the respective shafts, are denoted by the reference numerals 47ª and 47ᵇ, respectively, and are secured into and insulated from the ends of said shafts. Mounted upon the exterior of the casing are brushes 48ª and 48ᵇ, respectively, which bear upon the terminals in the ends of the respective shafts. Mounted on or forming a part of the vertical shaft 37, which extends through the casing, is a worm 49, meshing with both of the worm wheels 45ª and 45ᵇ, to thereby rotate the same in opposite directions.

Mounted upon the insulating switch board 12, shown in Figs. 2, 3, and 7, are two sets of contacts, one comprising the contacts 50ª, 51ª, and 52ª, and the other set consisting of contacts 50ᵇ, 51ᵇ, and 52ᵇ, between which the insulating switch bar 13, mentioned, moves. Two brushes are secured upon said switch bar 13, the one brush denoted by the reference character 53ª, and the other by the reference character 53ᵇ, and a coiled spring is provided between the two parts of each brush to impel the same apart into close contact with the contact elements on each side thereof, and said spring acts also as a conductor between the respective parts of the brush.

Mounted upon the front surface of the casing 10, is an insulating board 54, and mounted on said board are relay coils 55ª and 55ᵇ, respectively. Each of said relays is provided with a pivoted armature bar denoted by the reference characters 56ª and 56ᵇ, respectively, each of which is normally in contact with a terminal 58ª and 58ᵇ, respectively, but when the relay coils are energized, adapted to be swung out of contact therewith and into contact with terminals 57ª and 57ᵇ, respectively. A magnetic brake is also provided for contact with the large gear 41, to hold the same from rotation, and for this purpose a solenoid coil 59, is mounted on the interior of the casing and provided with a core 60, adapted when the coil is energized, to be impelled into contact with the surface of said gear. One terminal of said coil is grounded, and the other connected into an electric circuit hereinafter described.

Referring to Fig. 21, which is a diagram of the electric circuits of the apparatus, any source of E. M. F., such as a battery or generator, is denoted by the reference numeral 61, one terminal of which is grounded and the other terminal of which has connected thereto a main line wire 62, provided with a switch 63. Said main line wire 62, is connected directly to the central gravity acting lever 15, and a branch 64, from said main line wire is connected to wires 65ª and 65ᵇ, respectively, leading to the pivoted armature levers of the relays. The undergrounded terminal of the coil of the relay 55ª, has connected thereto the wire 32ª, and similarly the coil of the relay 55ᵇ, has connected thereto the wire 32ᵇ. The terminals 57ª and 57ᵇ, of the relays are connected by means of wires 66ª and 66ᵇ, to the contact elements 50ª and 50ᵇ, respectively, and the other relay contacts 58ª and 58ᵇ, respectively, are connected by means of wires 67ª and 67ᵇ, to the contact terminals 23ª and 23ᵇ, respectively. The armature bars 56ª and 56ᵇ, respectively, are normally in contact with the contacts 58ª and 58ᵇ, and when the relays are energized, swing into contact with the respective contacts 57ª and 57ᵇ. Connected to the other switch contact elements 51ª and 51ᵇ, are leads 33ª and 33ᵇ, respectively. The wire 68ª, leads from the contact terminal 52ª, to the resilient brush 48ª, for the magnetic clutch, and similarly wire 68ᵇ, leads from the contact element 52ᵇ, to the resilient brush 48ᵇ, for the magnetic clutch. The resilient terminal members 24ª and 24ᵇ, are connected to one another by a wire 58, and leading therefrom is a wire 69, which is connected to the terminal of the brake coil 59.

The operation is as follows:

Referring to Figs. 21 to 24 inclusive, Fig. 21 illustrates the position of the contact board and the gravity acting levers thereon when the vehicle on which the same is connected is on an even keel or in normal attitude for straight-away flight. The device is capable of actuating the controlling means of the vehicle when the same is deflected from its proper attitude in three different ways, according to different degrees and different intensities of deflection of the vehicle. First, assume a tilting of the aeroplane about its longitudinal axis, that is, resulting in a depression of the right wing and an elevation of the left wing; the instrument board 14, will then be tilted a slight amount in a clockwise direction, so that the central gravity acting lever 15, will receive, moved into contact therewith, the terminal 17ª. A circuit will thus be established through the gravity acting lever 15, contact 17ª, gravity acting lever 20ª, resilient contact member 21ª, terminal 22ª, with which the same remains in contact as the board is tilted, wire 32ª, to relay 55ª; thence by ground to battery 61, thence through switch 63, and main lead wire 62, to gravity acting lever 15. The current through the relay 55ª, causes the same to be energized, thus, moving the armature bar 56ª, into contact with the terminal 57ª, and a secondary circuit is set up from the source of E. M. F. 61, through switch 63, main lead wire 62, branch wire 64, wire 65ª, relay armature bar 56ª, contact 57ª, wire 66ª, contact element 50ª, brush 53ª, contact element 52ª, wire 68ª, to clutch 46ª, thence by ground returning to battery 61. The energizing of the clutch 46ª, of course causes the gear mechanism to rotate, whereby the rack bar, and subsequently the control lever 6, of the aeroplane is shifted to manipulate the controls thereof. The tilt of the aeroplane will thus be arrested and corrected, and as the aeroplane returns to normal flying attitude the board 14, of course moves therewith, thus causing the contact terminal 17ª, to retreat from the gravity acting lever 15, breaking the circuit to the relay 55ª, so that the armature thereof is released, thus breaking the secondary circuit to the clutch 46ª, so that actuation thereof ceases and the springs 8, on the control lever of the aeroplane return the controls to normal position. The momentum of the aeroplane continues the movement thereof back to normal, even though the release of the controls takes place prior to the time at which the aeroplane resumes its normal attitude. Thus over-control or tilting of the aeroplane in an opposite direction due to over-manipulation of the controlling means, is avoided.

Assume that the aeroplane is again tilted, that is, the right wing depressed and the left wing elevated a greater amount than assumed in the preceding instance; then the movement of the instrument board 14, will again take place, but to a greater degree. This movement of greater magnitude, as illustrated in Fig. 22, will cause the same sequence of operations to take place as described, but inasmuch as the tilting movement of the aeroplane is not arrested, a further series of operations takes place. The gravity lever 15, will receive the contact 17ª, thereagainst, whereby the gravity acting lever will be carried therewith as the board 14, moves with the aeroplane, and since the deflection of the aeroplane is of greater magnitude than in the preceding instance described, the contact point 22ª, will recede from the resilient contact member 21ª, thus breaking the circuit to the relay 55ª, while on the other hand the pivoted arm 26ª, which has frictional engagement with its pivot in the board 14, and moving, as it does with said board 14, will close contact with the gravity acting lever 20ª, and as a consequence a circuit will be immediately established through said relay 55ª, through the wire 32ª, to maintain the same energized.

The relay 55ª, is thus maintained energized to hold the relay armature bar in contact with the terminal 57ª, closing the circuit from the source of E. M. F. 61, through the wire 66ª, contact element 50ª, brush 53ª, contact element 52ª, wire 68ª, through magnetic clutch 46ª, and thence by ground to source of E. M. F. 61, so that the controls of the aeroplane will be manipulated a further degree than in the preceding instance by movement of the gears from the magnetic clutch 46. Thus the aeroplane controlling means actuated by the cables 4 and 5, will be kept in movement beyond that point at which the movement of the aeroplane was arrested in the first instance described. This will finally cause the brush 53ª, to move off from the contact element 50ª, so that an intermittent making and breaking of the circuit will take place as long as the relay is energized, to hold the controls substantially at an adjusted position.

Finally, however, the aeroplane will begin a return tilting movement, moving the board 14, therewith and this causes the arm 26ª, to swing out of contact with the lever 20ª, immediately breaking the circuit to the relay, causing the armature 55ª, to swing into contact with 58ª, and deënergizing the clutch 46ª. The movement of the armature 56ª, into contact with the point 58ª, however, closes the brake circuit from point 23ª, wire 67ª, point 58ª, armature 56ª, wire 65ª, wire 64, wire 62, source of E. M. F. 61, ground to brake coil 59, wire 69, wire 58, to point 24ª. The actuation of the brake of course serves to lock the mechanisms in an adjusted position, whereby the controls are held rigid against the stress of the springs 8, of the controlling lever while the plane is on its return movement from tilted position to normal.

As the aeroplane returns almost completely to normal, the terminal contact 23ª, will finally recede from the contact 24ª, sufficient to break the circuit, thus breaking the circuit to the brake 59. The springs 8, will then operate instantly to restore the controls to normal position. Closure of the contact 22ª, by resilient element 21ª, will next take place just before the machine reaches normal to close the magnetic clutch circuit for the time being, but the momentum of the aeroplane, returning under the effect of the brake held controls, will have made the effect of actuation of the controls due to closure of the contact 22, entirely negligible.

The next phase of operation for consideration is a maximum tilting of the aeroplane of a magnitude greater than the first two instances described, and one that cannot be adequately arrested nor rapidly enough, by movement of the controls in a manner and to such a limit as described in the first two cases. Assume the first and second parts of the operation of the apparatus to have taken place, so that the tilting of the aeroplane beyond extreme movement of the instances described, continues, and of course movement of the instrument board 14, therewith. Under such conditions, the arm 26ª, is in contact with the gravity acting lever 20ª, and the terminal 17ª, is in contact with the gravity acting lever 15, and the brush 53ª, is at an extreme end of the contact element 50ª. In view of the magnitude of deflection of the aeroplane from normal, however, the adjustment of the controls effected by such a position of the parts of the controlling apparatus has been insufficient to return the aeroplane to normal position or arrest the movement of the plane, and as the tilting angle becomes greater and the board moves therewith, the frictional arm 30ª, will be moved downwardly with the board 14, to contact the gravity acting lever 20ª. A circuit will now be established from the source of E. M. F. 61, main lead wire 62, gravity acting lever 15, contact 17ª, wire 34ª, gravity acting lever 20ª, frictional arm 30ª, through wire 33ª, to contact element 51ª, brush 53ª, contact element 52ª, wire 68ª, through magnetic clutch 46ª, and the movement of the brush 53ª, along with switch bar 13, out of contact with the contact element 50ª, will have no influence upon the circuit, the current passing through the contact element 51ª, brush 53ª, and contact element 52ª, the current leaving the magnetic clutch element 46ª, by ground and returning to the source of E. M. F. 61, to complete the circuit. The clutch therefore is operating independent of the relay 55ª, and will continue to operate until movement is arrested or the brush 53ª, slides off and out of contact with the element 51ª, this being the point of limiting adjustment of the aeroplane controls. At this point the springs 8, on the control level of the aeroplane will tend to restore the aeroplane controls to normal, thus moving the brush 53ª, back into contact with the elements 51ª and 52ª, and thus energizing the clutch 46ª, to again operate the controls and shift said brush out of contact, and this making and breaking of the circuit at the limiting position of the parts continues until the aeroplane begins its return tilting movement to normal attitude.

Of course, during a return movement of the board 14, the various mechanisms thereon are operated to close the electrical circuits in the sequence described with reference to the operation in the first two instances described, so that no manipulation of the controls will take place until the aeroplane has almost returned to its normal attitude and the controls will then be released to permit the aeroplane to continue its return under its own momentum to said original or normal attitude. It is obvious that the board 14, and its mechanisms will operate to restore the aeroplane to normal attitude, even though a deflecting effect occurs during a return movement of the aeroplane to normal from an inclined position. The device is immediately sensible to deflecting movements of the aeroplane, and, as pointed out, operates in three different ways according to three different degrees of deflection of the aeroplane, as shown in Figs. 22, 23, and 24, thus acting to adjust the controls to restore the aeroplane to normal attitude before the deflective movements may become so serious as to cause accident.

In a deflecting movement which takes place opposite to that described, that is, resulting in a depression of the left wing and an elevation of the right wing, exactly the same series of operations take place as described, except that the gravity acting lever 20ᵇ, switch contact elements 50ᵇ, 51ᵇ, 52ᵇ, and brush 53ᵇ, and magnetic clutch 46ᵇ, as well as the other "b" connections enter into the operation.

Although the board 14, may be adjustable, it, however, should never be necessary to adjust the angle of said board with respect to the aeroplane for the reason that the board and its mechanisms will act automatically to insure proper banking of the aeroplane in making a turn, due to the centrifugal force acting upon the gravity acting or plumb levers. That is to say, when the proper tilt of the aeroplane has been acquired, due to lateral swing of the gravity acting levers when a turn is made, the centrifugal force will maintain said gravity acting levers in the same relative position with respect to the instrument board as the levers would have when the aeroplane is flying horizontally and the board is in normal horizontal position. Any deviation from the banking angle will cause closure of the contacts to set the controlling means of the aeroplane in operation in the same manner as a deflection of the aeroplane from a horizontal flying attitude. When the aeroplane is straightened out upon its course, the centrifugal force of course vanishes, and the gravity acting levers swing downwardly by gravity to close certain of the contacts to thereby operate the controls of the aeroplane to tilt the aeroplane back to a normal attitude for straight-away flight.

The mechanisms described act under any and all conditions to afford lateral control for an aeroplane to a correct attitude in flight, insuring safe flying. Furthermore, the lateral controls are effected almost instantaneously and exactly to the degree or extent necessary to accomplish the result desired and with but a small fraction of the stress upon the aeroplane and controls therefor, resulting from even the most expert manual control.

I am aware that various details of construction may be varied through a wide range without departing from the principles of this invention, and I therefore do not purpose limiting the patent granted otherwise than necessitated by the prior art.

I claim as my invention:

1. The method of automatically controlling an aerial machine comprising adjustment of the controls thereof to restore the same to normal attitude of flight when deflected therefrom, then releasing and returning the controls to normal position before the aerial machine is completely restored to normal flying attitude, and thereby permitting the momentum thereof to continue the movement of the aerial machine to normal flying attitude.

2. The method of automatically controlling the stability of an aeroplane by operating the controls thereof to restore the aeroplane to proper attitude when deflected comprising adjustment of the controls to correct a deflection of the aeroplane and a release thereof and readjustment to normal prior to the complete movement of the aeroplane to proper attitude.

3. A mechanical method of aeroplane control wherein the controls of the aeroplane are actuated automatically different degrees according to the different degrees of deviation of the aeroplane from its proper attitude of flight, and whereby the controls are returned to normal prior to return of the aeroplane to proper attitude.

4. A mechanical method of aerial machine control wherein the controls of the machine are actuated automatically different degrees for different degrees of deflection of the machine from proper attitude during flight, so that said controls are operated in sequence through different degrees according to the degree of deflection of the machine to arrest and correct such movement thereof, and with said controls returned to initial position prior to the return of the machine to its initial attitude.

5. A method of automatic control for vehicles to obviate over-control comprising a release of the vehicle controls after an adjustment thereof, and complete return of said controls to initial adjustment, after a restoring movement has been imparted to the vehicle which has been deflected and prior to complete movement of the vehicle to its normal attitude.

6. An automatic mechanical method of aerial machine control utilizing the momentum developed in the restoring or return movement of the machine to normal attitude to complete the restoring movement thereof from a deflected to normal attitude of flight.

7. A method of aerial machine control involving mechanical actuation of the controlling means of the machine comprising adjustment of said means different degrees according to the degree of deflection of the machine from normal flight attitude, then releasing and returning the controlling means to normal position prior to complete restoration of the machine to normal attitude to utilize the momentum developed through the return movement of the machine to complete the restoration of the machine to normal attitude of flight.

8. A method of aeroplane control comprising automatic adjustment of the controlling means of the aeroplane to arrest the movement of the aeroplane and with said means held stationary during a portion of the return movement toward normal and finally released to normal position before the completion of the return of the aeroplane to normal attitude, thereby utilizing the momentum of the aeroplane to complete the return to normal.

9. A method of control for aeroplanes comprising a series of operations embracing adjustment of the controls different degrees to arrest the deflecting movement of the aeroplane from normal and held stationary at a limiting movement of adjustment to correct the deflection movements of the aeroplane and a release of the controls prior to the complete return movement of the aeroplane to normal thereby utilizing the momentum effects in completing the return movement and obviating over-control of the aeroplane.

10. In a stabilizing device for an aeroplane, the combination with an aeroplane and its controls, of power means connected to operate said controls, automatically acting mechanisms, comprising a control board rigidly associated with and adapted to move with the aeroplane in deflections thereof from normal attitude, and main and secondary control levers maintaining a certain relation to the axis of gravitational attraction on the aeroplane, normally open electrical circuits between said main and secondary levers adapted to be closed by relative movement of said board and levers and thereby effect the control of said power means to effect different adjustments of the aeroplane controls and independent automatic mechanism for positively returning said controls to normal after an adjustment imposed thereon by said means.

11. In a control mechanism for an aerial machine the combination with the controls of the machine, of power means for actuating the controls, gravity acting pendulum mechanism mounted transversely of the machine susceptible to gyratory movements of the machine about its longitudinal axis electrically connected to cause operation of said means, to effect an adjustment of the controls, and means automatically returning said controls to normal position after an adjustment by said means.

In testimony whereof I have hereunto subscribed my name in the presence of two subscribing witnesses.

ALFRED J. MACY.

Witnesses:
CHARLES W. HILLS, Jr.,
EARL M. HARDINE.